US012681199B2

(12) United States Patent
Lin et al.

(10) Patent No.: US 12,681,199 B2
(45) Date of Patent: Jul. 14, 2026

(54) METHOD FOR PREDICTING AN ON-SITE EARTHQUAKES USING ARTIFICIAL INTELLIGENCE AND SEISMIC P-WAVE PARAMETERS

(71) Applicant: P-Waver Inc., Taipei City (TW)

(72) Inventors: Pei-Yang Lin, Taipei City (TW);
Hsiu-Hsien Wang, Taipei City (TW);
Hung-Wei Chiang, Taipei City (TW)

(73) Assignee: P-WAVER INC., Taipei (TW)

( * ) Notice: Subject to any disclaimer, the term of this patent is extended or adjusted under 35 U.S.C. 154(b) by 689 days.

(21) Appl. No.: 18/156,656

(22) Filed: Jan. 19, 2023

(65) Prior Publication Data

US 2024/0248227 A1      Jul. 25, 2024

(51) Int. Cl.
G01V 1/30          (2006.01)
G06N 3/04          (2023.01)

(52) U.S. Cl.
CPC .............. G01V 1/307 (2013.01); G06N 3/04 (2013.01)

(58) Field of Classification Search
CPC .......... G01V 1/307; G01V 1/01; G01V 1/288;
G01V 1/282; G01V 1/30; G01V 1/364;
G01V 1/28; G01V 1/36; G01V 1/303;
G01V 11/007; G01V 1/32; G01V 1/3808;
G01V 1/00; G01V 1/48; G01V 1/50;
G01V 1/325; G01V 2210/6222; G01V
2210/324; G01V 2210/63; G06N 3/04;
G06N 3/08; G06N 3/045; G06N 3/044;
G06N 3/0464; G06N 3/02; G06N 3/043;
G06N 3/042; G06N 3/096; G06N 3/092;
G06N 3/091; G06N 3/09; G06N 3/0895;
G06N 3/088; G06N 3/082; G06N 3/084;
G06N 3/086; G06N 20/00

USPC .......... 367/14, 38, 21, 73, 9, 75, 31; 702/15,
702/14, 18, 2, 189, 1, 127, 142, 150, 155,
702/176, 17; 703/2; 706/15, 929, 12, 21,
706/16
See application file for complete search history.

(56) References Cited

U.S. PATENT DOCUMENTS

| | | | | |
|---|---|---|---|---|
| 2024/0248221 A1* | 7/2024 | Lin | ......................... | G01V 1/284 |
| 2024/0248227 A1* | 7/2024 | Lin | ......................... | G06N 3/08 |

FOREIGN PATENT DOCUMENTS

| | | | | | |
|---|---|---|---|---|---|
| AU | 2013217518 A1 | * | 8/2014 | ............. | G01V 1/288 |
| CN | 202025092 U | * | 11/2011 | | |
| CN | 111487679 A | * | 8/2020 | ............. | G06N 3/045 |
| CN | 111190225 B | * | 5/2021 | ............. | G01V 1/306 |
| CN | 115407390 A | * | 11/2022 | ............. | G01V 1/306 |

(Continued)

*Primary Examiner* — Shelby A Turner
(74) *Attorney, Agent, or Firm* — Michael W. Taylor;
Wolter Van Dyke Davis, PLLC

(57) ABSTRACT

A method for predicting an on-site seismic feature value using artificial intelligence is disclosed. The method includes the steps of obtaining a plurality of seismic historical data for a local position, wherein each of the seismic historical data includes seismic longitudinal wave information and a corresponding seismic transverse wave feature value, the seismic longitudinal wave information includes a plurality of data related to a vertical direction of ground surface, and the plurality of data include at least an acceleration value, a displacement value, a period and a velocity value; and based on at least the plurality of seismic historical data, obtaining a seismic transverse wave prediction model for the local position via an artificial intelligence calculation module.

10 Claims, 6 Drawing Sheets

(56)             References Cited

FOREIGN PATENT DOCUMENTS

| | | | | |
|----|----|----|----|----|
| CN | 115438716 A | * | 12/2022 | .............. G06N 3/08 |
| TW | 201411174 A | * | 3/2014 | |
| TW | I444648 | | 3/2014 | |
| TW | I636276 | | 12/2015 | |

* cited by examiner

METHOD FOR PREDICTING AN ON-SITE EARTHQUAKES USING ARTIFICIAL INTELLIGENCE AND SEISMIC P-WAVE PARAMETERS

FIELD OF THE INVENTION

The present invention relates to a method and device for predicting earthquake intensity, in particular to a method and device for predicting on-site seismic intensity and early warning analysis by new parameter setting and learning rules.

BACKGROUND OF THE INVENTION

Earthquakes cause different degrees of disasters in many areas, so the prediction technology of earthquakes is highly valued. Buildings or equipment located in areas with frequent seismic activities are often subject to damage and losses due to the earthquakes, particularly in the area close to the epicenter. Generally speaking, earthquake early warning technology can be divided into two categories: Regional seismic early warning technology and On-site seismic early warning technology. Using measurement data from multiple seismic stations located near the epicenter, the accuracy of seismic parameters predicted by regional earthquake early warning technology is usually higher than that of on-site seismic early warning technology. However, it allows a very limited time for the regional earthquake early warning system to pre-calculate the predicted seismic parameters before the destructive shock waves reach the peripheral area, making it difficult to let the personnel and equipment take immediate response and evacuate.

The ROC patent numbered I636276 proposes a seismic judgment model established by the Support Vector Classification (SVC) method based on the characteristics of the primary wave or longitudinal wave of the earthquake and relevant earthquake detection system to judge whether the received seismic data belongs to a seismic event or a non-seismic event, however, the method does not provide a practical method for predicting seismic intensity.

The ROC patent numbered I444648 proposes a seismic data analysis technology, which uses a neural network module to conduct real-time analysis of local earthquakes, and predicts magnitude of the seismic shear waves or transverse waves that will arrive at the detection site based on the seismic longitudinal waves detected at the detection site. The patent discloses a method of using up to 11 physical quantities as target values of the original physical quantities to obtain a required earthquake prediction model based on seismic historical data. It can be seen from the correlation diagram shown in its specification diagram that the model obtained by using this method is difficult to provide a sufficiently accurate and reliable prediction value.

In addition, due to differences in terms of geological structure, there may be significant differences between the on-site prediction models applied for different regions. However, in many remote areas, the historical earthquake data is very limited, so the available data content is insufficient for comprehensive estimation or prediction. Therefore, it is necessary to avoid the above-mentioned shortcomings of the prior art, and to construct on-site seismic prediction models suitable for different regions, which is a technical problem that needs to be solved.

SUMMARY OF THE INVENTION

The present invention provides a method and device for predicting on-site seismic intensity, which can instantly provide a sufficiently accurate and reliable prediction of the feature value of the seismic transverse wave. The model obtained by the present invention has an overall accuracy of nearly 99%, and is consistent in earthquake prediction regardless of the magnitude of the earthquake, which fully meets the needs of business requirements.

In accordance with one aspect of the present invention, a method for obtaining an on-site earthquake prediction model using artificial intelligence is disclosed. The method includes the steps of obtaining a plurality of seismic historical data for a local position, wherein each of the seismic historical data includes seismic longitudinal wave information and a corresponding seismic transverse wave feature value, the seismic longitudinal wave information includes a plurality of data related to a vertical direction of ground surface, and the plurality of data include at least an acceleration value, a displacement value, a period and a velocity value; and based on at least the plurality of seismic historical data, obtaining a seismic transverse wave prediction model for the local position via an artificial intelligence calculation module.

In accordance with another aspect of the present invention, an apparatus for predicting an on-site seismic intensity is provided. The apparatus for predicting an on-site seismic intensity includes a signal pre-processing module, configured to obtain a real-time seismic longitudinal wave vertical acceleration data, and to transform the real-time seismic longitudinal wave vertical acceleration data into a velocity value, a period and a displacement amount; and a real-time prediction module, coupled to the signal pre-processing module, and configured to receive the real-time seismic longitudinal wave vertical acceleration data, the velocity value, the period and the displacement amount, and to obtain an predicted feature value of a real-time seismic transverse wave corresponding to the real-time seismic longitudinal wave vertical acceleration data at the local position based on the real-time seismic longitudinal wave vertical acceleration data, the velocity value, the period and the displacement amount.

In accordance with a further aspect of the present invention, a method for predicting an on-site seismic intensity using artificial intelligence is disclosed. The method includes the steps of obtaining a real-time seismic longitudinal wave information including a velocity value, a period and a displacement amount; and using a seismic transverse wave prediction model to obtain an predicted feature value of real-time seismic transverse wave corresponding to the real-time seismic longitudinal wave information at a local position based on the real-time seismic longitudinal wave information, wherein the seismic transverse wave prediction model is obtained via an artificial intelligence calculation module, based on a plurality of seismic historical data.

The method and device for predicting the intensity of an earthquake in an on-site situation proposed by the present invention can be used around buildings or equipment in areas prone to earthquakes to reduce disasters due to earthquakes. Thus, the present invention has utility for industry.

The objectives and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; they are not intended to be exhaustive or to be limited to the precise form disclosed.

Figure 1:
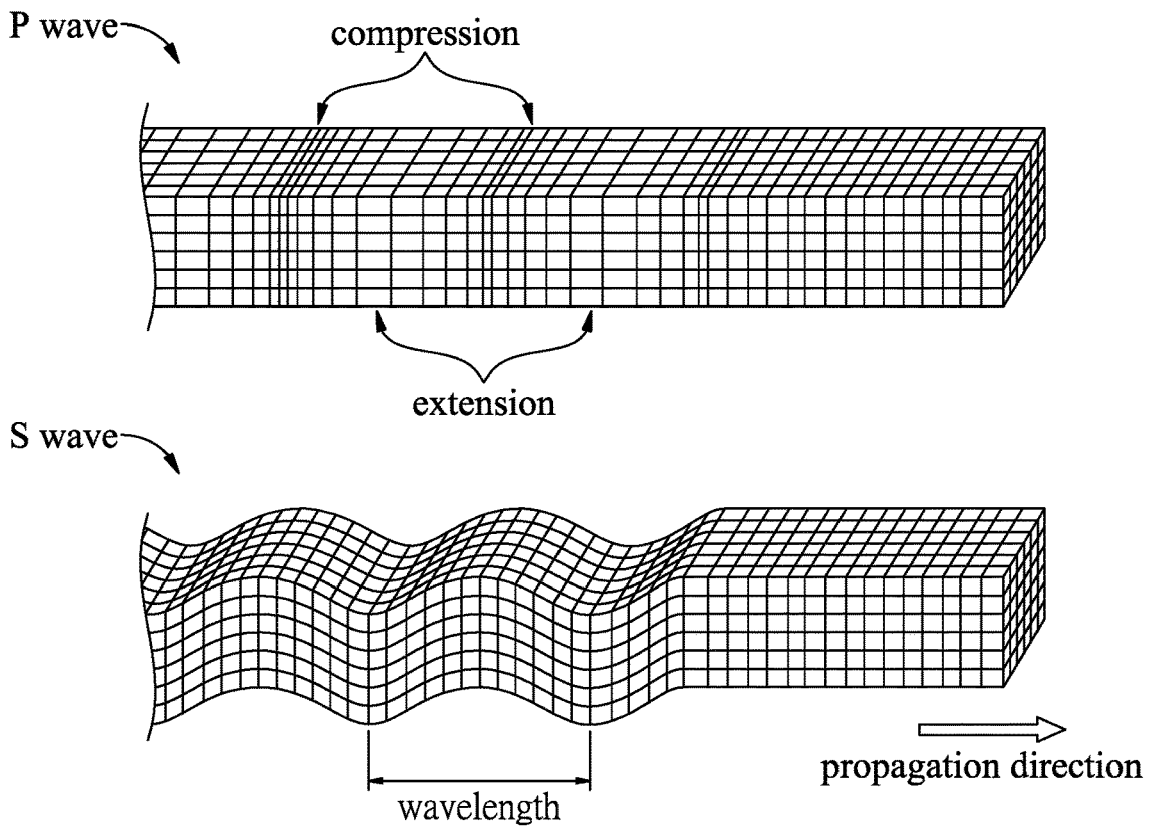
FIG. 1 is a schematic diagram showing seismic longitudinal and transverse waves.
Figure 2:
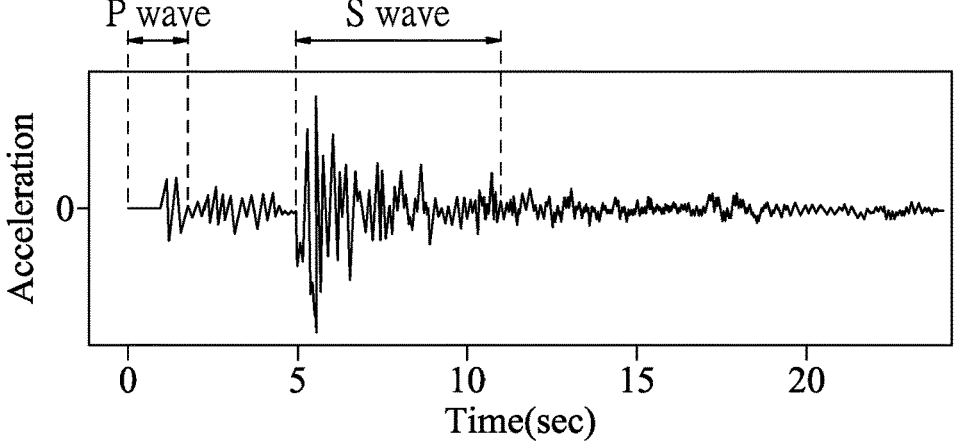
FIG. 2 is a schematic diagram showing the time and acceleration of seismic longitudinal and transverse waves to a specific location.

Please refer to FIG. 1 and FIG. 2, the former is a schematic diagram of a conventional seismic longitudinal wave and transverse wave transmission mode, and the latter shows the time and acceleration of seismic longitudinal and transverse waves to a specific location. Since the wave velocity of the longitudinal wave is about 6-8 kilometers per second on the ground surface, and the wave velocity of the transverse wave is about half that of the longitudinal wave, it can be clearly observed there is a certain interval between the arrival time of the longitudinal wave and that of the transverse wave at a certain distance from the epicenter. For example, at a distance of about 10 kilometers from the epicenter, the time interval between the arrival of longitudinal waves and transverse waves is 3 seconds. If there is a device that can effectively estimate the magnitude of subsequent transverse waves based on the measurement data of longitudinal waves within this time period, there is an opportunity to take immediate safety measures to reduce the loss of equipment and personnel that may be caused due to the earthquake to a certain limit.

Figure 3:
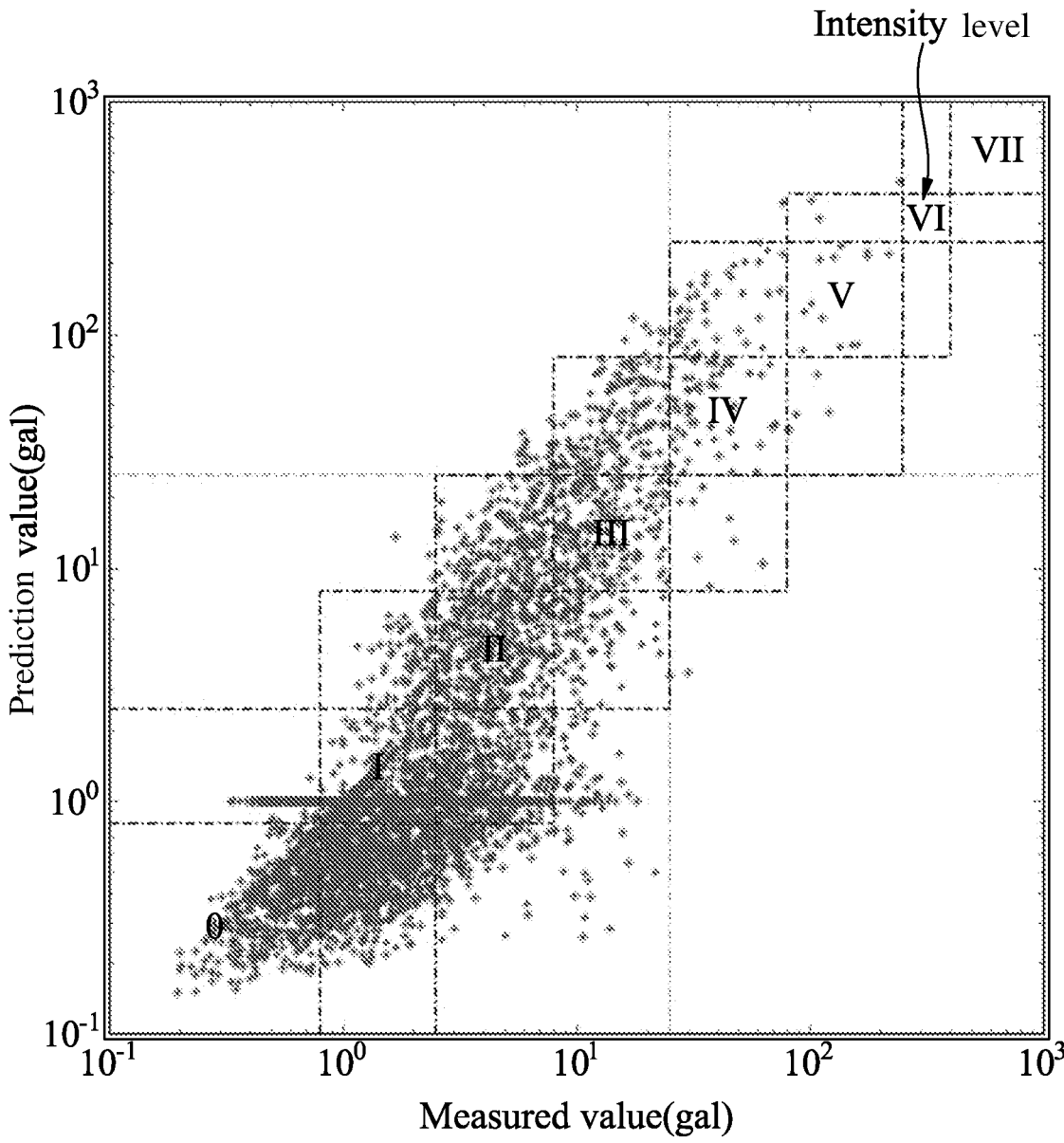
FIG. 3 is a schematic diagram showing the correlation between the predicted seismic intensity value obtained according to the prior art and the actual measured value.

FIG. 3 shows the correlation diagram between the actual measured value and the predicted value of the predicted transverse-wave seismic level by the earthquake verification model established with the use of the Support Vector Classification (SVC) method based on the historical data measured by multiple stations in Taiwan and the newly received P-wave data, according to the above-mentioned ROC patent No. I636276. It can be seen from the figure that, although the earthquake prediction value of this method has an overall accuracy of 94.8%, the accuracy of prediction for earthquakes of small seismic intensities is obviously low. The prediction is considered to be accurate when the error of the predicted value of the seismic intensity level is not more than 1. However, the seismic intensity level prediction ability of the above-mentioned SVC method has a 5% probability of misjudgment. Under such conditions, it is difficult for high-tech and high-precision manufacturers to take preventive actions based on their real-time predicted results, because it may cause false alarms and the consequent losses will be too much. In addition, for high-tech equipment such as wafer production or precision manufacturing, an earthquake with a magnitude of less than 2 is still likely to result in the output of defective products and damage to the equipment. Therefore, the seismic intensity level prediction technology with the SVC method is not enough to meet the practical needs of the high-tech and high-precision manufacturing industry.

The embodiment of the present invention proposes a method based on local data regarding the longitudinal waves, that is, only the seismic longitudinal wave information in the direction perpendicular to the ground surface is sufficient to be used to accurately estimate the maximum acceleration value or the maximum velocity value of the transverse wave. In addition, information of these longitudinal waves, such as the absolute value of the maximum acceleration, the absolute value of the maximum velocity, the absolute value of the maximum displacement, the equivalent period, the square integral of the velocity, the cumulative absolute acceleration, the cumulative absolute velocity, the cumulative absolute displacement, the absolute displacement integral, the absolute velocity integral, the absolute acceleration integral value, the velocity square integral value, and etc., can be obtained instantly from the longitudinal wave information in the direction perpendicular to the ground surface through circuit components such as integrators. Therefore, the method of the embodiment of the present invention can be quickly and effectively implemented merely based on the data collected by the measuring device configured to collect the acceleration in the direction perpendicular to the ground surface.

In order to obtain a suitable seismic transverse wave prediction model, according to an embodiment of the present invention, a neural network module similar to that provided in the above-mentioned ROC patent I444648 can be used to carry out the training of the on-site seismic model. Compared with the prior art using more than 30 three-dimensional (north-south, east-west, and vertical) parameters, the embodiment of the present invention only selects 6 to 8 parameters in one dimension (vertical direction), which may fully simplifies the complexity of the model calculation and thereby obtaining a more accurate prediction model.

Figure 4:
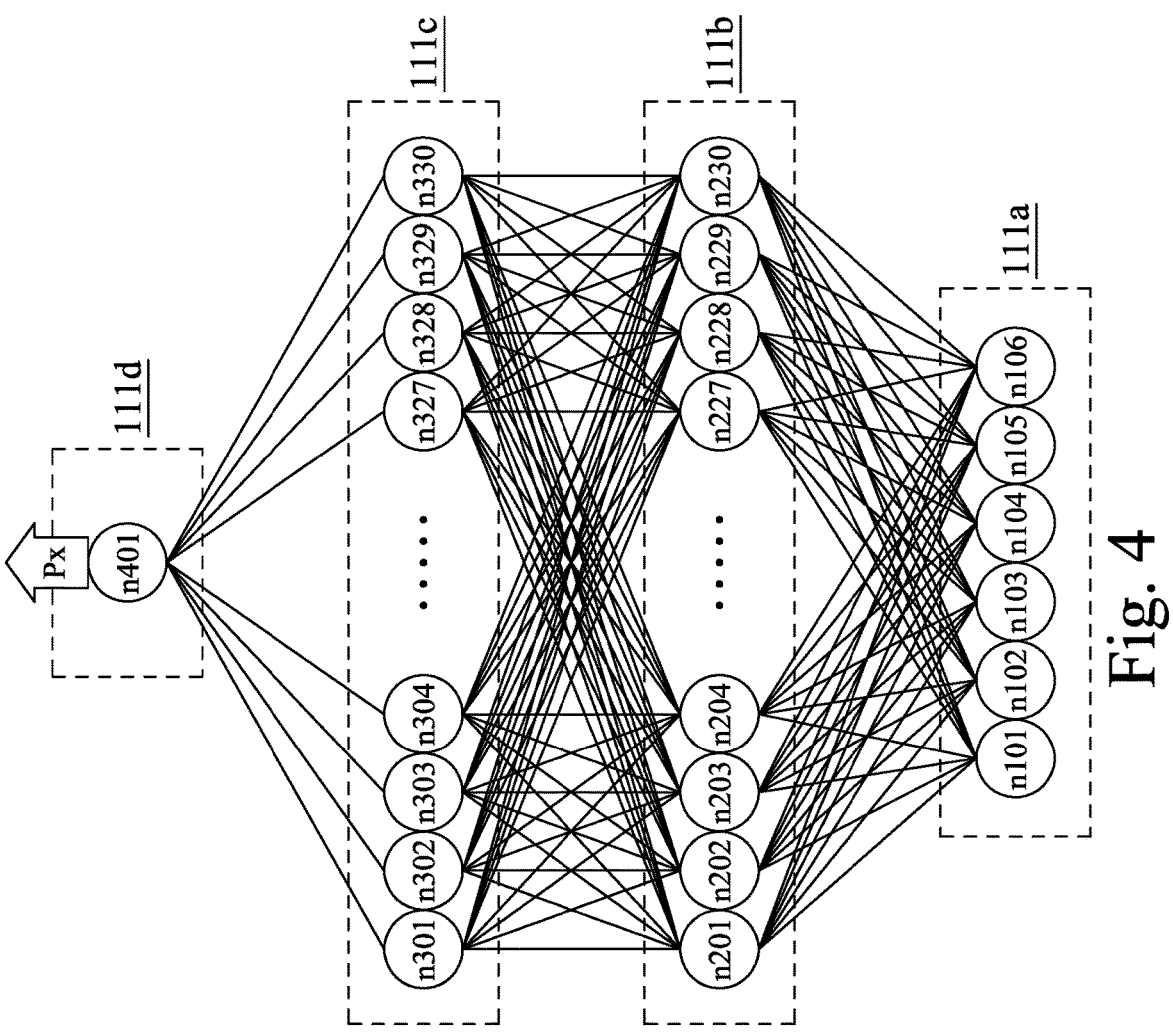
FIG. 4 is a schematic diagram of an embodiment of using a neural network algorithm module according to the present invention.

Please refer to FIG. 4, the neural network module 111 is a real-time seismic analysis system and method applied to the ground surface under an earthquake condition. In one embodiment, the neural network module 111 constructed for ground surface seismic analysis includes a plurality of neurons which form four layers and are connected to each other, each neuron has a link weighting corresponding to another neuron in the next layer, and each link weighting is repeatedly adjusted by inputting the actually measured historical seismic data into the neural network module 111.

In one embodiment, the neural network module 111 includes an input layer 111*a*, a second-order hidden layer 111*b*, a third-order hidden layer 111*c*, and an output layer 111*d*. The input layer 111 includes 6 first-order neurons n101, n102, n103, n104, n105, n106; the second-order hidden layer 111*b* includes 10 to 30 second-order neurons (according to the characteristics of the site and the practical conditions through optimization and automatic induction adjustment) n201, n202, n203, n204 . . . n230 are respectively connected to the first-order neurons n101~n1*xxx*; the third-order hidden layer 111*c* includes 10 to 30 third-order neurons (according to the characteristics of the site and the practical conditions through optimization and automatic induction adjustment) n301, n302, n303, n304 . . . n330 are respectively connected to the second-order neurons n201~n230; the output layer 111d contains plural (such as 2 or more) fourth-order neurons n401 connected to the third-order neurons n301~n330, and each of the fourth-order neurons n401 outputs a fourth-order output value including various required seismic transverse wave feature parameters, such as acceleration, velocity or displacement value, in the three-axis direction.

In one embodiment, the operating processor of the embedded computing host converts the filtered historical data of longitudinal waves in the vertical direction through data conversion (such as conventional linear normalization and exponential normalization) before inputting it into the neural network module, so as to obtain a plurality of predicted seismic transverse wave feature parameters, and the parameters are compared with the actual measured historical seismic transverse wave data to adjust the connection weightings of each neuron. The filtered historical seismic data of longitudinal waves in the vertical direction (such as historical uniaxial acceleration, velocity, displacement or period, and etc.) will be input to the input layer 111a of the neural network module 111. The output result from the output layer 111d will be used to be compared with the historical seismic data, so as to modify, adjust and correct the number of neurons and connection weightings of each layer of the neural network module 111, and gradually improve the accuracy of the neural network module 111.

The neural network module 111 can be used for real-time analysis of actual earthquake events after being adjusted by the historical seismic data of the local position, and the output results and the actual measured data can enable the neural network module 111 to further adjust and continuously improve its accuracy. The actual operation method is as follows: first, based the acceleration data in vertical direction of the seismic longitudinal wave received by the instrument during a certain analysis period (such as 0 to 3 seconds; based on the first arrived wave, the system determines that the current moment of the earthquake event is the 0th second), the feature parameters are predicted, for example: absolute value of maximum acceleration, absolute value of maximum velocity, absolute value of maximum displacement, equivalent period, square integral of velocity, cumulative absolute acceleration, cumulative absolute velocity, cumulative absolute displacement, absolute value of displacement integral, absolute value of velocity integral, six to eight of the feature parameter value are input into the input layer 111a of the neural network module 111. After data conversion, there may be hundreds or even hundreds of thousands of historical data. Taking 6 parameters as an example, each set of data contains the data of 6 parameters in the vertical direction to the ground surface. The huge amount of data is selected randomly to provide data for the input layer 111a. Each first-order neuron n101-n106 in FIG. 4 will output the first-order output value, that is, the input data value of each longitudinal wave.

The second-order neurons n201 to n230 of the second-order hidden layer 111b respectively receive the first-order output values from the first-order neurons n101 to n1xxx, and respectively output a second-order output value. Each second-order neuron n201-n230 and each first-order neuron n101-n1xxx have a "connection" (that is, the line segment connecting the first and the second order neurons in the figure), and each connection has a "first-order connection weighting" obtained after adjustment based on the historical seismic data. According to an embodiment, the following Formulas 1 and 2 can be applied, and each second-order output value transmitted through each connection can be the sum of the output values of the first-order neuron n101-n1xxx multiplied by the "first-order connection weighting" of the each first-order/second-order neuron connection, plus a first error correction constant.

$$U_i = \sum_{j=1}^{M} W_{ij} V_j + I_i \qquad \text{Formula 1}$$

$$V_i = f(U_i) = \frac{1}{1 + \exp(U_i)} \qquad \text{Formula 2}$$

Wherein $W_{ij}$ is the connection weighting; $U_i$ is the sum of the signals of the neurons in the upper layer connected to each Wij; Vj is the activation function of the neuron; $I_i$ is the random noise or error correction constant; I is the serial number of each neuron; j is the serial number of the neuron of the upper layer; M is the total number of neurons in the previous layer. In addition, for each neuron i to be corrected, in order to simplify the complexity of the training process and reduce the amount of calculation, the connection weight $W_{ij}$ can also be optionally set to a constant value during the training, and thus $W_{ij}$ can be simplified to $W_i$.

Similarly, the third-order neurons n301 to n330 of the third-order hidden layer 111c respectively receive the second-order output values of the second-order neurons n201-n230, and respectively output a third-order output value. There is a "connection" between each third-order neuron n301-n330 and each second-order neuron n201-n230 (that is, the line segment connecting the second and the third-order neurons in the figure), and each connection has a "second-order connection weighting" obtained after adjustment based on historical seismic data. According to the aforementioned Formulas 1 and 2, the third-order output value transmitted through each connection can be the sum of the output values of the second-order neuron n201-n2xxx multiplied by the "second-order connection weighting" of the each second-order/third-order neuron connection, plus a second error correction constant.

Similarly, the fourth-order neuron n401 of the output layer 111d receives the third-order output values of the third-order neurons n301-n330, and the fourth-order neuron n401 outputs a fourth-order output value. There is a connection between each fourth-order neuron n401 and each third-order neuron n301-n330 (that is, the line segment connecting the third and the fourth-order neurons in the figure), and each connection has a "third-order connection weighting" obtained after adjustment based on historical seismic data. According to the aforementioned Formulas 1 and 2, the fourth-order output value transmitted through each connection can be the sum of the output values of the third-order neuron n301-n3xxx multiplied by the "third-order connection weighting" of the each third-order/fourth-order neuron connection, plus a third error correction constant. In one embodiment, the fourth-order neurons may be plural, and each of which has a "connection" with each third-order neuron n301-n330.

According to an embodiment, the fourth-order output value Px is one of a maximum transverse wave surface acceleration (PGA) value and a transverse wave maximum velocity value (PGV). In one embodiment, the fourth-order output values may also be plural, which correspond to plural fourth-order neurons, for example, two fourth-order neurons output the maximum surface acceleration (PGA) value and the maximum transverse wave velocity value (PGV) respectively. According to another embodiment, the fourth-order output value is at least one of a maximum transverse wave surface acceleration (PGA) value and a maximum transverse wave displacement value. The above-mentioned embodiments are only exemplary to represent the method of using the neural network algorithm module to obtain the seismic transverse wave prediction model in the embodiment of the present invention. Practically, the neural network algorithm module can be adjusted to three or five orders, contents and number of inputs and outputs can also be adjusted as necessary. The fourth-order output value predicted each time can be used to compare with the actually measured transverse wave value of the historical data corresponding to the input, so as to correct the connection weighting or these errors according to the difference between the predicted value and the actual measured value and the constant, and then input another randomly selected P-wave historical data after data conversion as the input value, as the data of each node in the input layer 111*a* of the neural network module 111, and then perform another round of prediction, comparison and correction until the predicted fourth-order output value is sufficiently close or consistent with the actual measured value of the transverse wave in the historical data.

Figure 5:
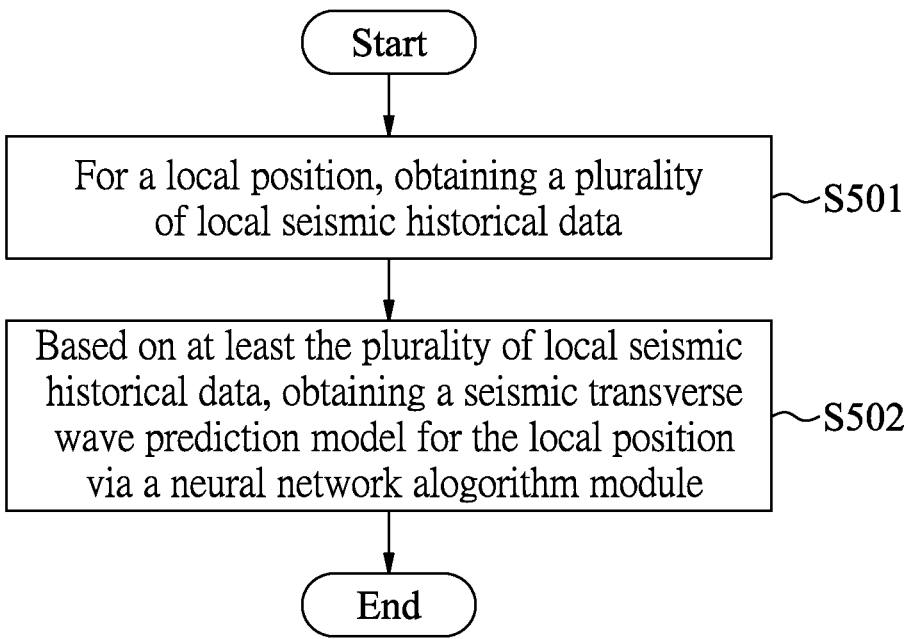
FIG. 5 is a schematic diagram showing an embodiment of a method for obtaining an on-site seismic prediction model according to the present invention.

Referring to FIG. 5, which shows a schematic diagram showing an embodiment of a method for obtaining an on-site seismic prediction model according to the present invention. Basically, the embodiment of the present invention uses the seismic history data measured at the local position to obtain the relationship between the seismic longitudinal wave information and the transverse wave feature value of the earthquake. First of all, for a local position, obtaining a plurality of historical seismic data (step S501); and at least according to the historical seismic data, obtaining a seismic transverse wave prediction model for the local position via an artificial intelligence calculation module which can be a neural network calculation module (step S502). Each of the seismic history data includes seismic longitudinal wave information and a corresponding seismic transverse wave feature value. According to an embodiment, each of the seismic longitudinal wave information includes 6-8 signals of the absolute value of the maximum acceleration, the absolute value of the maximum velocity, the absolute value of the maximum displacement, the equivalent period, the square integral of the velocity, the cumulative absolute acceleration, the cumulative absolute velocity, the cumulative absolute displacement, the absolute displacement integral, the absolute velocity integral, the absolute acceleration integral value, the velocity square integral value and etc., along the direction perpendicular to the ground surface. The feature values of seismic transverse wave include the maximum acceleration and maximum velocity value and/or the maximum displacement value in the three-axis directions. In addition, the plural historical seismic data disclosed in this application may include one of plural local earthquake historical data, plural non-local historical data and combinations thereof.

According to different embodiments of the present invention, the method of obtaining the seismic transverse wave prediction model can be obtained by using other artificial intelligence algorithm methods in addition to the above-mentioned neural network algorithm module. Those with ordinary skill in the art understand that machine learning essentially uses mathematical algorithms to analyze patterns in data, learn relevant patterns, and use them for prediction and decision-making. In terms of algorithm, there are Bayesian classification, decision tree, linear regression, decision tree and forest model, principal component analysis, popular learning, K-method clustering, Gaussian mixture model and so on. Reinforcement learning, also known as rewarding learning or evaluation learning, is also one of the techniques of machine learning. The so-called reinforcement learning is the learning of the intelligent system from the environment to the behavior mapping, so as to maximize the reward signal (reinforcement signal) function value, and then obtain the required seismic transverse wave prediction model. As shown in the above-mentioned Formula 1 and Formula 2, the model generated by the arithmetic expression arranged at each node is basically in the form of a polynomial function. Similarly, in order to obtain the seismic transverse wave prediction model based on the longitudinal wave and transverse wave data of the historical seismic records, those skilled in the art can also use a computer to execute different learning modes. Therefore, the method for obtaining the seismic transverse wave prediction model of the present invention can be collectively referred to as an artificial intelligence algorithm method, and the above-mentioned neural network algorithm module is also an artificial intelligence calculation module.

According to the seismic intensity classification method announced by the Central Meteorological Administration of Taiwan government, the seismic intensity level before 2020 is directly calculated by the maximum acceleration value of the ground surface, that is, only the maximum acceleration value in the three-axis direction of the transverse wave is concerned; and since 2020, the seismic intensity classification will also require to consider the maximum speed value. The method of the embodiment of the present invention takes different specifications into account at the same time, and can first obtain the prediction of the seismic transverse wave feature value and then convert it into a seismic intensity level. According to another embodiment, the subsequent processing may also be performed directly according to the obtained prediction value of the seismic transverse wave feature value. For example, sending earthquake emergency response notifications to local units.

For different geographical areas, due to the differences in terms of the geological environment, the applicable seismic transverse wave prediction models may have great differences. Due to the remoteness of some areas or the infrequent occurrence of earthquakes, there is insufficient historical data to obtain effective neural network algorithm results. In the embodiment of the present invention, the rich seismic historical data in Taiwan or Japan can be used to make up for the needs of those areas where the historical data is insufficient, so as to apply the model. According to an embodiment, taking northern India as an example, the historical data measured by the earthquake measurement unit in the region can be combined with the historical data measured by the Central Meteorological Bureau of Taiwan to jointly provide the required neural network calculation, and the results can be in line with prediction model.

Figure 6:
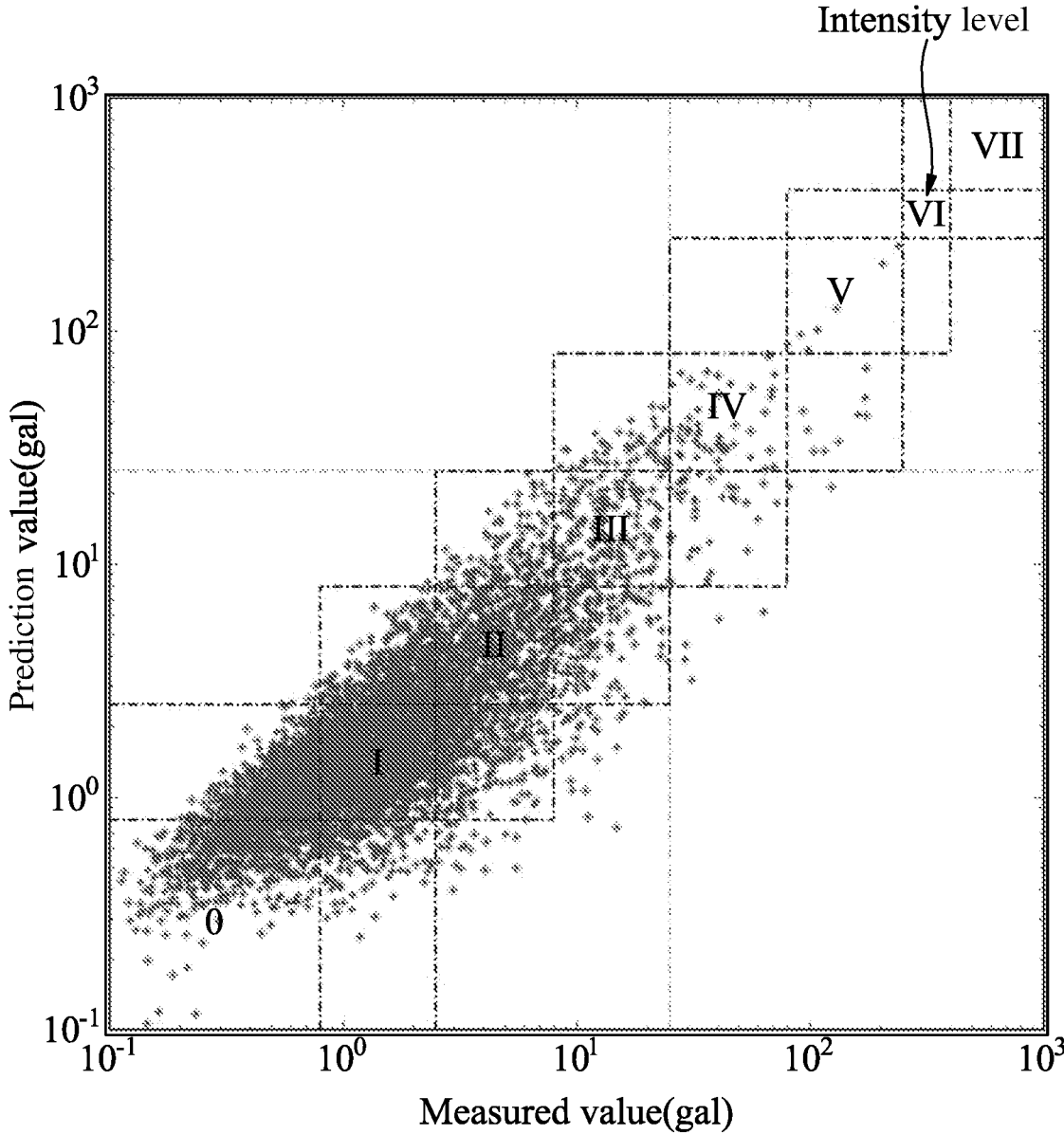
FIG. 6 is a schematic diagram showing the correlation between the predicted seismic intensity obtained by the method for predicting the intensity of an on-site earthquake according to an embodiment of the present invention and the actual measured value.

Refer to FIG. 6, which a schematic diagram showing the correlation between the predicted seismic intensity obtained by the method for predicting the intensity of an on-site earthquake according to an embodiment of the present invention and the actual measured value. The one shown in the figure is based on the vertical direction information of longitudinal waves, such as the maximum acceleration absolute value, the maximum velocity absolute value, the maximum displacement absolute value, the equivalent period, integration value of the absolute acceleration, integration value of the velocity square and etc., to obtain the model for the implementation of prediction. The model obtained by the embodiment of the present invention has an overall accuracy of nearly 99%, and the earthquake prediction is consistent regardless of the magnitude of the earthquake, which fully meets the needs of the business model, and can be considered as a major innovation in technology.

Figure 7:
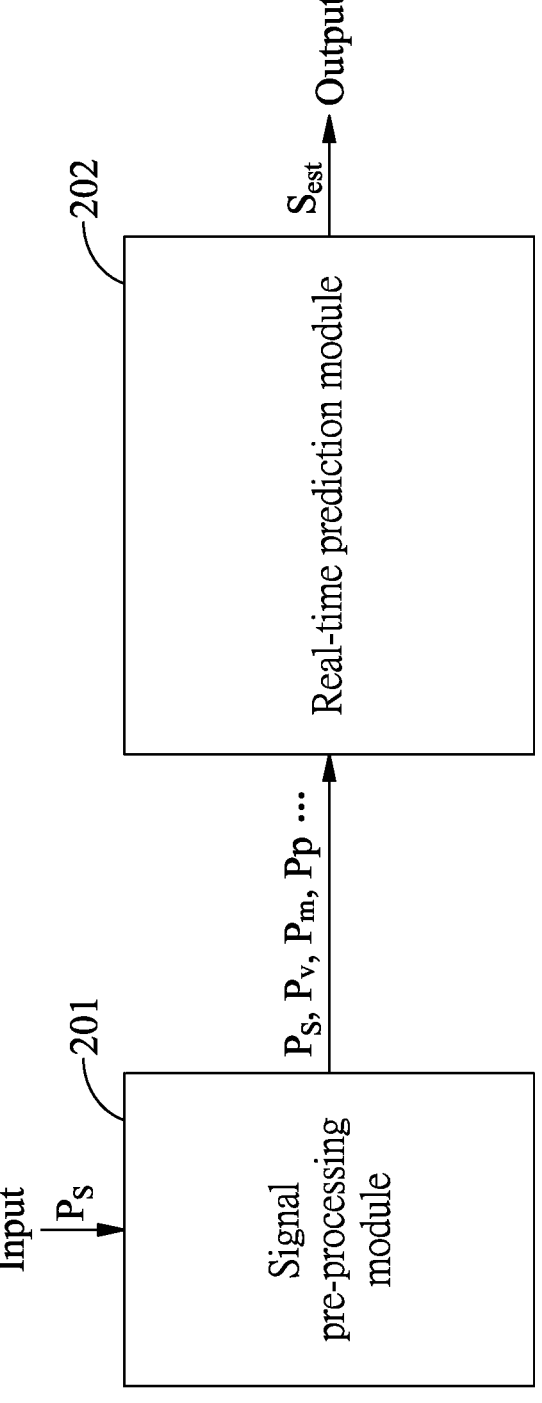
FIG. 7 is a schematic diagram of a device for predicting the on-site seismic intensity according to an embodiment of the present invention.

FIG. 7 is a schematic diagram of a device for predicting the on-site seismic intensity according to an embodiment of the present invention. The signal pre-processing module 201 is configured to obtain a real-time seismic longitudinal wave vertical acceleration data Ps, and convert the real-time seismic longitudinal wave vertical acceleration data Ps into a velocity value Pv, a displacement amount Pin and an equivalent period Pp. The real-time prediction module 202 is coupled to the signal pre-processing module 201, receives the real-time seismic longitudinal wave vertical acceleration data Ps, the velocity value Pv, the displacement amount Pm and the equivalent period Pp, and obtains information about the measuring position corresponding to the equivalent period Pp according to these data. An predicted feature value Sest of the real-time seismic transverse wave for the instant seismic longitudinal wave vertical acceleration data Ps is therefore obtained. The real-time prediction module is obtained by using the above method through a neural network algorithm module. Wherein, the sources (may be one or more sensors) of the plurality of seismic historical data obtained at the local position may or may not include the source (possibly a sensor) of the real-time seismic longitudinal wave vertical acceleration data Ps obtained at the measurement position. In some embodiments, the monitoring range of the host and the sensors at the local position may not overlap with the monitoring range of the host and the sensor at the measurement position.

Through the foregoing embodiments, the storage device and method capable of maintaining a dry state provided by the present invention should be a major innovation in technology field. Obviously, the apparatus and method of the present invention can achieve many effects that are hard to expect by prior arts.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for obtaining a seismic transverse wave prediction model, comprising the following steps of:

using at least one sensor to obtain a plurality of seismic historical data for a local position, wherein each of the seismic historical data includes seismic longitudinal wave information and a corresponding seismic transverse wave feature value, the seismic longitudinal wave information includes a plurality of data related to a seismic transverse wave, and the plurality of data consist of at least one of an absolute value of maximum acceleration, an absolute value of maximum velocity, an absolute value of maximum displacement, an equivalent period, an integration value of absolute acceleration and an integration value of velocity square; and obtaining a seismic transverse wave prediction model for the local position via an artificial intelligence calculation by:

inputting the seismic historical data into the artificial intelligence calculation module, wherein the artificial intelligence calculation module comprises:

an input layer comprising six to eight first-order neurons and configured to receive the plurality of data;

a second-order hidden layer comprising 10 to 30 second-order neurons respectively connected to the six to eight first-order neurons;

a third-order hidden layer comprising 10 to 30 third-order neurons respectively connected to the 10 to 30 second-order neurons; and an output layer comprising a fourth-order neuron connected to the 10 to 30 third-order neurons and configured to output a predicted feature value of real-time seismic transverse wave; and for each of the second-order hidden layer, the third-order hidden layer and the output layer, calculating a signal summation value $U_i$ by each neuron i in a current layer from a previous layer according to:

$$U_i = \sum_{j=1}^{M} W_{ij} V_j + I_i,$$

wherein:

i is a serial number of a neuron in the current layer;

j is a serial number of a neuron in the previous layer;

Wij is a connection weighting between neuron i in the previous layer and neuron i in the current layer;

Ui is a sum of signals of neurons in the previous layer connected to Wij;

Vj is an activation output of neurons;

Ii is a random noise or an error correction constant; and

M is a total number of neurons in the previous layer, calculating the activation output of each neuron according to:

$$V_i = f(U_i) = \frac{1}{1 + \exp(U_i)},$$

wherein the seismic transverse wave prediction model is configured to output the predicted feature value, and the predicted feature value is one of a maximum transverse wave surface acceleration (PGA), a maximum shear wave velocity value (PGV) and a maximum transverse wave displacement value, and is configured to be converted into an on-site seismic intensity according to a predetermined seismic intensity conversion relationship.

2. The method according to claim 1, wherein the artificial intelligence calculation module is a neural network algorithm module.

3. The method according to claim 1, further comprising:

obtaining a plurality of reference seismic historical data, each of which includes the seismic longitudinal wave information and the corresponding seismic transverse wave feature value; and based on the plurality of seismic historical data and the plurality of reference seismic historical data, obtaining the seismic transverse wave prediction model for the local position via the artificial intelligence calculation module.

4. The method according to claim 3, wherein the seismic historical data are collected by a seismic measurement unit near the local position, and the reference seismic historical data are collected by a Taiwanese seismic measurement unit.

5. The method according to claim 1, further comprising: using at least one further sensor to obtain a real-time seismic longitudinal wave information including the plurality of data related to the seismic transverse wave from a measurement position, wherein sources of the plurality of seismic historical data include or exclude a source of the real-time seismic longitudinal wave information.

6. An apparatus including at least one sensor for predicting an on-site seismic intensity, comprising:

a signal pre-processing module, configured to obtain a real-time seismic longitudinal wave vertical acceleration data by using the at least one sensor, and to transform the real-time seismic longitudinal wave vertical acceleration data into a velocity value, a period and a displacement amount; and a real-time prediction module, coupled to the signal pre-processing module, and configured to:

receive a plurality of data;

obtain a seismic transverse wave prediction model via a neural network algorithm module based on a plurality of seismic historical data obtained by using at least one further sensor, wherein the neural network algorithm module comprises:

an input layer comprising six to eight first-order neurons;

a second-order hidden layer comprising 10 to 30 second-order neurons respectively connected to the six to eight first-order neurons;

a third-order hidden layer comprising 10 to 30 third-order neurons respectively connected to the 10 to 30 second-order neurons; and an output layer comprising a fourth-order neuron connected to the 10 to 30 third-order neurons and configured to output a predicted feature value of real-time seismic transverse wave;

only input six to eight seismic longitudinal wave related parameters selected from the plurality of data into the input layer of the seismic transverse wave prediction model;

obtain the predicted feature value of a real-time seismic transverse wave corresponding to the real-time seismic longitudinal wave vertical acceleration data at a measurement position by using the seismic transverse wave prediction model based on the real-time seismic longitudinal wave vertical acceleration data, the velocity value, the period and the displacement amount; and convert the predicted feature value into the on-site seismic intensity according to a predetermined seismic intensity conversion relationship, wherein:

the plurality of data includes an absolute value of maximum acceleration, an absolute value of maximum velocity, an absolute value of maximum displacement, an equivalent period, an integration value of absolute acceleration and an integration value of velocity square; and the predicted feature value includes one of a maximum transverse wave surface acceleration (PGA) value, a maximum shear wave velocity value (PGV) and a maximum transverse wave displacement value.

7. The apparatus according to claim 6, wherein the plurality of seismic historical data are collected by a local seismic measurement unit.

8. A method for predicting an on-site seismic intensity, comprising the following steps of:

obtaining a real-time seismic longitudinal wave information from a measurement position by using at least one sensor, wherein the real-time seismic longitudinal wave information includes a plurality of data;

obtaining a seismic transverse wave prediction model via a neural network algorithm module based on a plurality of seismic historical data obtained by using at least one further sensor, wherein the neural network algorithm module comprises:

an input layer comprising six to eight first-order neurons;

a second-order hidden layer comprising 10 to 30 second-order neurons respectively connected to the six to eight first-order neurons;

a third-order hidden layer comprising 10 to 30 third-order neurons respectively connected to the 10 to 30 second-order neurons; and an output layer comprising a fourth-order neuron connected to the 10 to 30 third-order neurons and configured to output a predicted feature value of real-time seismic transverse wave;

only inputting six to eight seismic longitudinal wave related parameters of the plurality of data into the input layer of the seismic transverse wave prediction model;

using the seismic transverse wave prediction model to obtain the predicted feature value of real-time seismic transverse wave corresponding to the real-time seismic longitudinal wave information at the measurement position based on the real-time seismic longitudinal wave information, wherein the predicted feature value includes one of a maximum transverse wave surface acceleration (PGA) value, a maximum shear wave velocity value (PGV) and a maximum transverse wave displacement value; and converting the predicted feature value into the on-site seismic intensity according to a predetermined seismic intensity conversion relationship, wherein:

the plurality of data include an absolute value of maximum acceleration, an absolute value of maximum velocity, an absolute value of maximum displacement, an equivalent period, an integration value of absolute acceleration and an integration value of velocity square.

9. The method according to claim 8, wherein the seismic transverse wave prediction model is obtained further based on a plurality of reference seismic historical data in combination with the plurality of seismic historical data.

10. The method according to claim 8, wherein the predicted feature value includes a surface maximum velocity value.

* * * * *